Sept. 11, 1956

C. F. DE VOE 2,762,167

GLASS BLENDING

Filed March 23, 1953

INVENTOR.
CHARLES F. DEVOE
BY Rolf E. Schneider
ATTORNEY.

2,762,167
Patented Sept. 11, 1956

2,762,167

GLASS BLENDING

Charles F. De Voe, Corning, N. Y., assignor to Corning Glass Works, Corning, N. Y., a corporation of New York Application March 23, 1953, Serial No. 344,133

2 Claims. (Cl. 49—77)

The present invention relates to the conditioning of glass for the production of relatively large or massive glass objects which are not only substantially cord-free but whose individual index of refraction varies throughout within a very narrow range and is particularly directed to the production of such high-quality glass objects on a continuous basis.

In the continuous melting of glass, as will be appreciated, the glass stream flowing through the forehearth or other feeding arrangement from the batch-melting tank or other container varies in refractive index both longitudinally (i. e., with time) and transversely (i. e., cross section-wise at any given time). Longitudinal variations generally result from changes in the batch and in the melting conditions; transverse variations generally result from volatilization of molten glass constituents and from corrosion or erosion of the melting-container refractories and evidence themselves in the form of cords or striae.

The presence of such variations is of no particular significance in the production of most types of glassware. When glass designed for ophthalmic and optical purposes is being melted, however, the presence of such variations assumes primary importance since the quality and, hence, the saleability of the resulting ware are controlled thereby; and the reduction or substantial elimination of such variations becomes not only desirable but essential if satisfactory ware, i. e., ware in which the degree of homogeneity or variation of refractive index within an individual piece is maintained within a desired degree of tolerance, is to be produced.

By careful control of the batch composition together with maintenance of the melting conditions substantially constant, longitudinal variation of the refractive index can be held within a relatively narrow tolerance and, in some instances, has been held so that it is no greater than $\pm 2 \times 10^{-4}$. Through use of the homogenizing or stirring procedure described in my Patent No. 2,569,459 issued on October 2, 1951, cords or striae present in the glass can be substantially completely eliminated.

Such controlled melting in combination with such stirring procedure has proved highly successful in the continuous pressing of ophthalmic lens blanks, precision optical parts, and the like. This combination has also been used with a reasonable degree of satisfaction in the casting of somewhat larger pieces of glass especially when the casting step itself is carried out in the manner described in Patent No. 2,534,415 issued to Robert C. Cleveland and William H. Said on December 19, 1950, which points out that, to avoid striae due to lapping or folding, the stream of glass being cast should be intercepted sufficiently close to its source so that spiralling thereof is prevented.

Where large masses of glass having an individual degree of homogeneity or overall refractive index variation within even closer tolerances, and especially within $\pm 5 \times 10^{-5}$, are desired, however, such stirring procedure has not proved sufficient even though the melting operation is controlled to the extent indicated above. Such large glass masses find use in the manufacture of aerial camera lenses, wind-tunnel windows, and the like and may weigh from twenty to more than a hundred pounds each and require an individual overall refractive index variation no greater than $\pm 3 \times 10^{-5}$ or less.

As can readily be determined, the stirrer, which is conveniently operated in a vertical position, accomplishes primarily horizontal or transverse homogenization of the cords in the glass passing therethrough. While some overall blending of such glass may also occur, the extent of the same is very limited in any event so that the longitudinal refractive index variation of the glass remains substantially unchanged.

So long as the mass or volume of the desired glass piece, such as an ophthalmic lens blank, remains quite small compared to that of the stirring device, such longitudinal variation will not show up in the individual pieces of glass to an appreciable extent; and it may be possible to obtain a blank with an overall refractive index variation of less than $\pm 5 \times 10^{-5}$. As the volume of the glass piece is increased, however, such longitudinal variation becomes increasingly evident; and it is not possible to obtain castings approaching or exceeding the stirring device in volume and having an individual variation of refractive index less than that of the molten glass stream fed from the melting container to the stirrer.

It would seem at first glance that this difficulty could be readily resolved by increasing the size of the stirrer to maintain the same volume relationship between the stirrer and the glass piece as obtains in the pressing of ophthalmic lens blanks. To do so, however, would be not only mechanically impracticable particularly with regard to the size of the stirrer that would be required but also economically unfeasible.

I have now discovered that the production of large or massive glass castings exceeding the stirrer in volume and having an individual refractive index variation materially less than the refractive index variation longitudinally of that glass occupying the channel between the continuously melted supply body and a blending zone can be successfully accomplished by introducing and blending the continuously melted stream of glass into a body of previously melted glass in such zone of sufficient size and under such conditions that substantially greater uniformity of refractive index is imparted to the molten glass body as a whole prior to its passage through the stirrer. Such blending is effected by maintaining a body of molten glass advantageously exceeding the desired casting in volume, continuously introducing the stream of glass issuing from such channel into such body, and subjecting such body of molten glass and the glass introduced thereinto from such channel to repeated rapid circulation.

By means of the present invention, it is thus possible to produce from such continuously melted molten glass, the refractive index of which varies with time and which contains cords or striae, relatively large glass masses having an individual overall refractive index variation substantially less than the refractive index variation of the glass along the channel length with time. In carrying out the invention, molten glass issuing from the channel is continuously introduced into a body of molten glass contained in a confined blending zone advantageously relatively large in volume compared to that of the desired glass mass as above pointed out; the resulting blended glass is passed to an elongated confined stirring zone whose volume is small compared to that of the desired glass mass; and the resulting blended and stirred glass is cast to form the desired glass mass. Maintenance of the overall refractive index variation within such cast glass mass within the indicated tolerance is accomplished in accordance with the invention by subjecting the body of molten glass contained in the blending zone to continuous, repeated, rapid circulation so as to blend therewith the stream of glass continuously introduced into such zone to control the variation of the refractive index with time of the blended glass passed to the stirring zone within such tolerance. Elimination of the cords or striae is accomplished by subjecting the blended glass to repeated shearing as it passes through the stirring zone. In this manner I have been able to obtain substantially cord-free cast glass masses weighing upwards of fifty to sixty pounds each and possessing an overall refractive index variation of less than $\pm 3 \times 10^{-5}$ from a continuously melted stream of glass varying in refractive index with time as much as $\pm 2 \times 10^{-4}$.

I have also found that, under such circumstances, the overall refractive index variation of the cast glass mass can readily be maintained within the desired tolerance provided that the conditions under which the glass is continuously melted are so controlled that the average of the longitudinal refractive index variations of the resulting continuously melted glass stream is no greater during the casting of such glass mass than:

$$\frac{dn}{1-fe^{-fP/B}}$$

where $dn$ is the maximum variation desired in the refractive index of the cast glass mass
$B$ is the volume of the blending zone
$P$ is the volume of the cast glass mass
$f$ is the efficiency of the blending zone, and
$e$ is the base of the natural logarithms.

So long as the average of the refractive index variations of the continuously melted stream of glass with time does not exceed the limit indicated by such formula during the casting operation, a cast glass mass having an overall refractive index variation equal to the indicated tolerance can be obtained regardless of the nature of the refractive index variation of the glass stream with time.

Various arrangements can be utilized in carrying out the instant invention. The apparatus described and claimed in the pending application of Robert C. Cleveland, S. N. 343,833, filed concurrently herewith and which issued as Patent No. 2,716,023 is, however, particularly well suited for such purpose. One form of such apparatus is diagrammatically illustrated in the accompanying drawing, in which:

Figure 1:
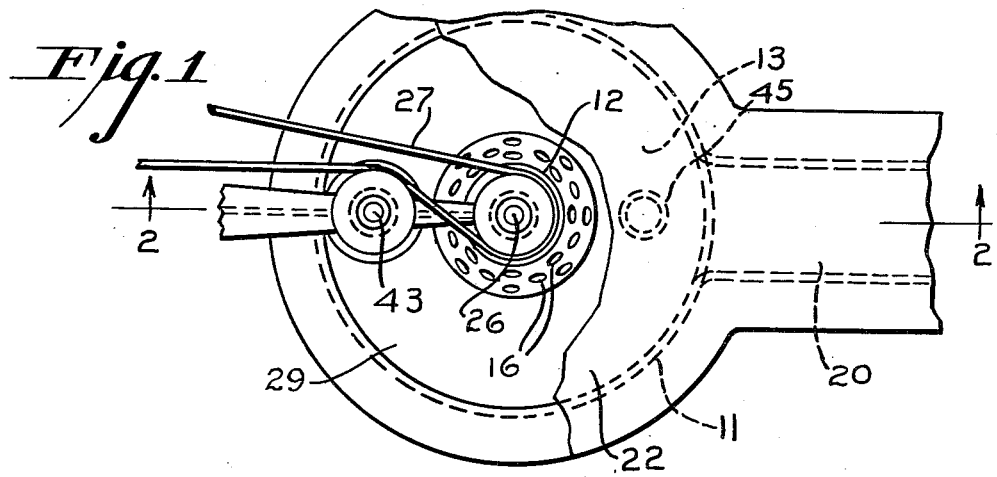
Fig. 1 is a plan view, with parts broken away, of such apparatus.
Figure 2:
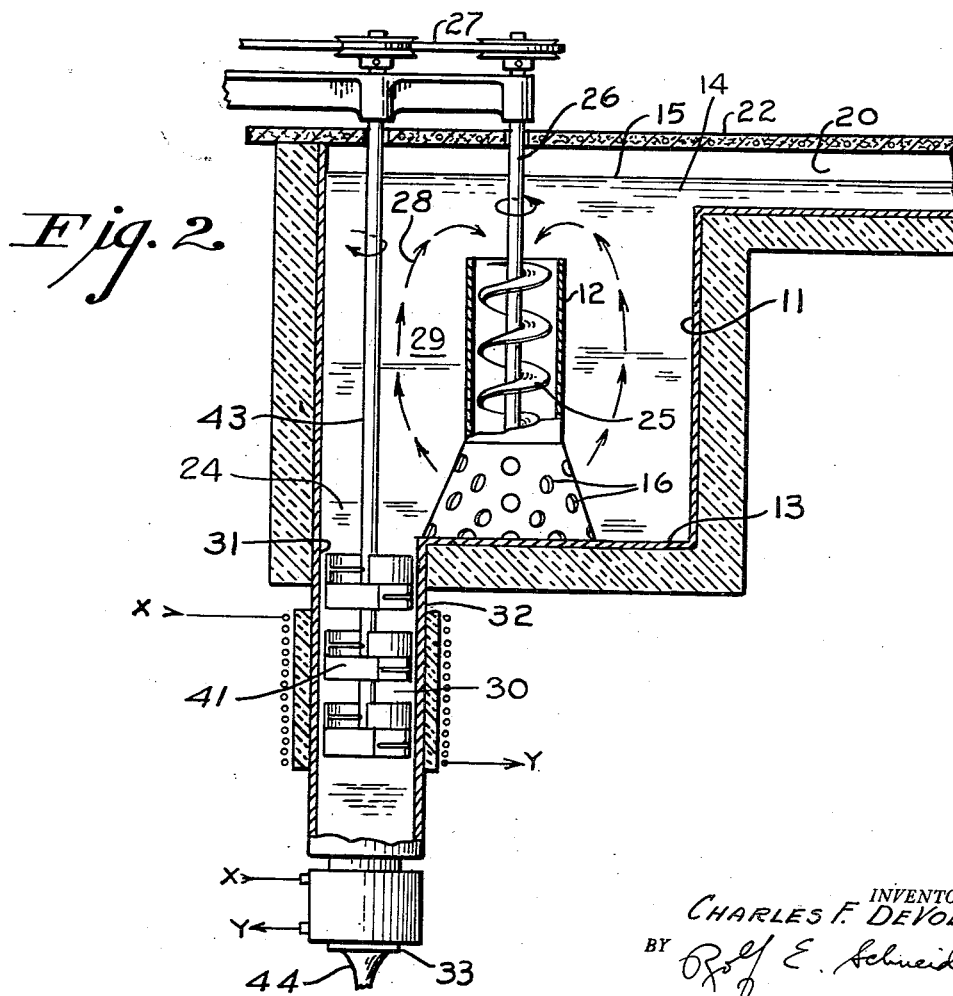
Fig. 2 is a sectional elevation taken along the line 2—2 of Fig. 1.

As indicated in the drawing, such apparatus includes a molten-glass receiving and blending chamber 11, which is preferably generally circular in plan and which is provided with a vertically arranged circular stack or cylinder 12 advantageously centrally disposed therein. Circular stack 12 rests on and is joined to the bottom 13 of the blending chamber surrounding a blending zone 29 and is so arranged that its open top terminates appreciably short of the normal glass line 15. Near its bottom the stack is provided with annular rows of perforations 16 for affording circumferential and desirably symmetrical communication between its interior and the interior of the blending chamber 11. A channel 20 forms the means for continuously feeding molten glass as a stream 14 to chamber 11 from a parent supply body (not shown). As indicated, chamber 11 is heavily insulated; and a cover 22 desirably having embedded electrical resistance heaters is provided for chamber 11 and channel 20 to assist in maintaining the body of glass in chamber 11 at a substantially uniform temperature.

A screw-type impeller or pump 25 carried by a shaft 26 projecting down through cover 22 into the interior of stack 12 is adapted for rotation by means of a belt 27 to effect rapid circulation of molten glass within the chamber 11. Advantageously, impeller 25 is so rotated that the body of molten glass is circulated in the general manner indicated by the dotted arrows 28. The clearance or coupling between impeller 25 and circular stack 12 is conveniently such that some slippage of molten glass over the peripheral edge of the impeller screw can take place.

An outlet 31 in the bottom 13 of chamber 11 provides a path for the passage of a stream 24 of blended glass into a cylindrical housing 32 surrounding a stirring zone 30 having a volume considerably less than that of chamber 11. Mounted within cylindrical housing 32 on a shaft 43 projecting down through cover 22 and chamber 11 is a stirrer 41, which may comprise sets of stirring elements such as those shown in Fig. 3 of my above-mentioned patent. As indicated, shaft 43 is also rotated by belt 27 but preferably in the opposite direction from shaft 26 in order to minimize surface disturbances. At its other end housing 32 is provided with a depending outlet tube 33 for feeding the blended and stirred glass 44 in accordance with the casting procedure described in the above-mentioned Cleveland et al. patent.

In operation, the molten glass continuously flowing into chamber 11 through channel 20 is continuously blended with the body of molten glass already contained in chamber 11 by repeated circulation of such body of glass in the manner previously indicated. Such circulation is advantageously effected at a rate considerably greater than that at which the stream of molten glass is introduced into the blending chamber whereby practically immediate blending of such glass with the body of molten glass already in the chamber is accomplished. Since the amount of glass introduced into the blending chamber in a given time is the same as that fed from the stirring housing and since the volume of the body of molten glass in the blending chamber is advantageously relatively large in comparison to the volume of the glass mass being cast, only a relatively small volume of freshly melted glass is introduced into the blending chamber during such time in comparison to the volume of glass already in such chamber. In this manner, only a very slight change in the overall refractive index of such glass body occurs upon blending of such stream therewith whenever there is a longitudinal variation in the refractive index of the latter; and control of the longitudinal variation of the refractive index of the blended glass passed to the stirring zone within the tolerance desired in the cast glass mass is thereby readily effected.

As the glass within chamber 11 is being circulated therein, a portion of such blended glass is continuously being fed through outlet 31 into stirring housing 32 wherein the stirring elements of stirrer 41 subject the same to a repeated primarily horizontal shearing action which serves to attenuate and thereby eliminate any cords or striae present in such glass. Although the circulation within chamber 11 serves to effectively reduce the longitudinal variation in the refractive index of the glass introduced into stirring housing 32, no significant shearing action can be simultaneously exerted on the circulating glass because of the large volume of the body of glass contained in chamber 11 and the relatively high speed at which it is desirable to circulate the same. Accordingly, any cords present in the stream of glass fed to chamber 11 are still substantially present in the stream of glass withdrawn therefrom through outlet 31.

What is claimed is:

1. The method of conditioning molten glass to impart to articles cast therefrom a high degree of uniformity of index of refraction, which includes maintaining a first body of molten glass confined between a source of supply thereof and a communicating second body thereof from which glass to be cast slowly issues in a small cross sectional stream from a region of the second body remote from that in communication with the first body into a casting mold to form an article therein, and rapidly circulating and recirculating the glass throughout such first body to partly homogenize the glass thereof and to rapidly blend therewith the glass received from the supply body while stirring the glass in the second body to substantially complete the homogenization of the glass thereof before its issuance into the casting mold.

2. The method as claimed in claim 1, in which the volume of the first body of molten glass is larger than the volume of the said article.

References Cited in the file of this patent

UNITED STATES PATENTS

| | | |
|---|---|---|
| 2,467,809 | Cannon et al. | Apr. 19, 1949 |
| 2,569,459 | De Voe | Oct. 2, 1951 |

FOREIGN PATENTS

| | | |
|---|---|---|
| 711,976 | France | July 8, 1931 |